United States Patent [19]

Barnes et al.

[11] Patent Number: 4,483,946

[45] Date of Patent: Nov. 20, 1984

[54] REFRACTORY, HEAT-INSULATING LINER

[76] Inventors: Andrew Barnes, 37 Garland Way, Northfield, Birmingham; Raymond W. Yates, 12 Brookhouse Road, Broadway, Walsall, West Midlands, both of England

[21] Appl. No.: 460,263

[22] Filed: Jan. 24, 1983

Related U.S. Application Data

[63] Continuation of Ser. No. 276,827, Jun. 24, 1981, abandoned.

[30] Foreign Application Priority Data

Jun. 25, 1980 [GB] United Kingdom ................. 8020844

[51] Int. Cl.$^3$ ............................................... B28B 7/36
[52] U.S. Cl. ....................................... 523/145; 75/95; 106/38.23; 106/38.5 R; 106/214; 523/147; 524/47
[58] Field of Search ............... 106/38.23, 38.5 R, 214; 75/95; 523/139, 146, 145, 147; 524/47

[56] References Cited

U.S. PATENT DOCUMENTS

| 2,127,298 | 8/1938 | Isaacs | 106/214 |
| 2,399,489 | 4/1946 | Landes | 260/17.3 |
| 2,452,054 | 10/1948 | Jones et al. | 260/17.3 |
| 2,523,626 | 9/1950 | Jones et al. | 260/17.3 |
| 3,155,527 | 11/1964 | Mentzer | 106/214 |

*Primary Examiner*—Lorenzo B. Hayes
*Attorney, Agent, or Firm*—Cushman, Darby & Cushman

[57] ABSTRACT

A shaped, refractory, heat-insulating liner comprises particulate refractory material, a water-soluble borate compound and, as binder, starch and a urea-formaldehyde resin. The starch helps provide suitable transverse strength, the resin protects the starch from moisture and promotes good surface properties and the borate compound enhances the transverse strength and the integrity of the liner at high temperature. The article e.g. a slab is useful for lining metallurgical vessels e.g. tundishes.

6 Claims, No Drawings

REFRACTORY, HEAT-INSULATING LINER

This is a continuation of application Ser. No. 276,827 filed June 24, 1981, now abandoned.

This invention relates to shaped refractory, heat-insulating articles and to metallurgical vessels lined with such articles.

It is known to provide metallurgical vessels with refractory, heat-insulating linings to reduce the rate of heat loss from molten metal in the vessels and for related purposes. For example, such linings are commonly provided in the heads of ingot moulds, in head boxes for ingot moulds and in the feeder heads of casting moulds and, as disclosed by British patent specification No. 1364665, such a lining may be provided as an inner lining in a tundish. The linings are commonly expendable and comprise one or more preformed shaped articles e.g. a set of slabs or, in connection with moulds, a sleeve or a set of slabs.

Preformed shaped articles for providing expendable, refractory, heat-insulating linings for metallurgical vessels usually comprise particulate refractory matter and a binder and usually also refractory fibres and/or organic fibres. The compositions may also contain exothermically reactive ingredients.

The shaped articles are usually made by dewatering an aqueous slurry of the ingredients in a permeable mould, removing the damp shape from the mould, heating the shape to dry it and causing or allowing the binder to harden.

A wide variety of binder systems has been proposed for the shaped articles but none of the known systems is entirely satisfactory in every respect.

It has been found in accordance with the invention that the shaped articles can advantageously be made by use of a combination of two particular types of binder and a particular type of additive.

According to the present invention a shaped, refractory, heat-insulating article comprises particulate refractory material, a water-soluble borate compound and, as binder, a urea-formaldehyde resin and a starch.

The article can conveniently be made by putting a water containing mixture of the ingredients in a mould, if necessary then removing any excess water by dewatering the mixture in the mould, and then heating the mixture to dry it and to harden the binder.

In the articles, the starch serves primarily to impart adequate transverse strength to them. The starch has some tendency to migrate towards the surface of the articles during manufacture but this tendency is only slight and thus the starch enables good bonding to be achieved throughout the thickness of the articles. However, the urea-formaldehyde has a marked tendency to migrate to the surfaces of the articles as a result of the heating step used in their manufacture. Given the presence of the starch, the migration of the urea-formaldehyde resin is advantageous in that it aids the formation of articles having hard, smooth surfaces resistant to abrasion. Furthermore, because the urea-formaldehyde resin migrates towards the surfaces of the article and performs the above function there, small proportions of the resin are quite sufficient. In the invention it is usually preferred that the proportion of the urea-formaldehyde resin in the article should be from 1 to 4% by weight and that the proportion of the starch should be from 1 to 6% by weight. If the article is of relatively low density, say less than 0.85 g/cm$^3$, it may be desirable to use a rather higher proportion of the urea-formaldehyde resin and/or of the starch.

Phenol-formaldehyde resins can be used as binder in shaped, refractory, heat-insulating articles to impart adequate transverse strength and such resins have little or no tendency to migrate during manufacture of the articles. Furthermore, although phenol-formaldehyde resins are expensive compared with starch and are less widely available such resins have been widely used rather than starch. Shaped, refractory heat-insulating articles have a tendency to pick up moisture and, whilst this has little effect on the strength of bond produced by use of phenol-formaldehyde resins, it can severly weaken a bond produced by use of starch as the sole binder. In accordance with the invention it has been found that the use of the urea-formaldehyde resin serves to protect the starch from moisture and thus the use of the starch is satisfactory rather than there being any need for the more expensive and less widely available phenol-formaldehyde resin.

In addition to the fact that the urea-formaldehyde/starch binder system of the invention is advantageous as discussed above, it has been found that the effectiveness of this particular binder system is enhanced by the use of the water-soluble borate compound. This effect is surprising in that water-soluble borate compounds are not binders in their own right. Furthermore, even very low proportions of the borate compound yield the effect. Preferably the proportion of the borate compound in the article is 0.5 to 5% by weight. The borate compound is preferably an alkali metal borate such as a sodium borate, e.g. borax, or boric acid.

The use of the borate compound yields two distinct benefits. First, the use of the borate compound enhances the transverse strength of the article before use. As the borate compound is not a binder in itself, it appears that the enhanced strength results from some type of interaction, perhaps complex formation, between the borate compound and the starch but the invention is not to be limited by this hypothesis. The enhanced transverse strength is not achieved if a water-insoluble boron compound is used. Secondly, the use of the water-soluble borate compound enhances the integrity of the article in use i.e. when it is in contact with, or exposed to heat from, molten metal e.g. steel.

Phenol-formaldehyde resins are known to be able to produce a binding effect having good resistance to relatively high temperatures whereas it has generally been accepted that the cheaper and more widely available starch yields a much less temperature resistant bond. However, in articles of the invention a bond having good temperature resistance can be achieved and, without limiting the invention to this theory, it appears that at service temperatures although much of the starch structure is rapidly destroyed, the borate compound promotes sintering and in this way helps maintain the integrity of the article. The existence of good bonding at high temperatures is especially valuable in the case of an article, e.g. a slab, part of which is exposed to radiant heat from molten metal but is not in direct contact with the metal. In such cases there is no metallostatic pressure to help maintain the integrity of the part of the article not in direct contact with the molten metal but that part is exposed to high temperatures and oxygen from the atmosphere, a combination that normally tends rapidly to destroy binder systems and thus cause disintegration of the article.

The water-soluble borate compound has a substantial tendency to migrate towards the surfaces of the articles as a result of the heating step used in their manufacture and thus is available in the surface regions to help maintain the integrity of these regions in use, these regions being subjected to particularly high temperatures in use. The small proportions of the borate compound that suffice to give the benefits described do not adversely affect the refractoriness and erosion resistance of the articles.

The particulate refractory material in articles of the invention may be, for example, one or more of silica, alumina, magnesia and refractory silicates and preferably provides 75 to 95% by weight of the article. Some of the refractory material may be lightweight e.g. calcined rice husks and fly ash floaters. Especially if the article has to withstand particularly erosive conditions, it is preferred that the particular refractory material should include a proportion of carbonaceous matter e.g. anthracite dust. The articles of the invention preferably contain fibrous matter. The inclusion of fibrous matter makes the articles more difficult to fracture and tends to reduce their density and thus enhance their heat-insulating properties. It also increases the 'green' strength, i.e. before heating to dry the article and harden the binder, of articles made by dewatering an aqueous slurry. If the articles are to be made by a method involving the use of an aqueous slurry, it is preferred that at least some organic fibres, preferably paper fibres, should be present as they impart stability to the slurry. If organic fibres are present, the proportion in the article is preferably from 0.3 to 3% by weight. Preferred refractory fibres are calcium silicate fibres e.g. slag wool and aluminosilicate fibres. If refractory fibres are present, the proportion in the article is preferably 1 to 10% by weight.

In addition to the articles themselves, a metallurgical vessel having an expendable lining comprising one or more of the articles forms a further part of the invention. In particular, a tundish according to the invention comprises an outer metal casing, a permanent lining of refractory material adjacent the casing and an expendable inner lining comprising a number of articles of the invention in the form of slabs.

The invention is illustrated by the following Examples.

EXAMPLE 1

An aqueous slurry was formed containing the following ingredients in the specified relative proportions by weight:

| Ingredient | % by weight |
| --- | --- |
| silica flour | 60.5 |
| silica sand | 30.0 |
| paper | 0.5 |
| borax | 1.0 |
| slag wool | 4.0 |
| urea-formaldehyde resin | 2.0 |
| starch | 2.0 |

The slurry was then dewatered in a permeable mould to form a slab and the slab was removed and heated to dry it and harden the binder. The density of the slab was 1.05 g/cm$^3$ and it had a transverse strength of 22 kg/cm$^2$. The slab performed well when used as part of the inner lining of a tundish used in the continuous casting of steel.

EXAMPLE 2

A slab was made as in Example 1 except that the proportion of silica flour was reduced to 53.5% by weight, the proportion of silica sand was reduced to 27% by weight and 10% by weight of anthracite dust was included. The density of the slab was 1.05 g/cm$^3$ and it had a transverse strength of 20 kg/cm$^2$. The slab performed well when used as part of the inner lining of a tundish used in the continous casting of steel and the slab had particularly good erosion resistance.

EXAMPLE 3

A slab was made as in Example 1 but using the following ingredients in the specified relative proportions.

| Ingredient | % by weight |
| --- | --- |
| deadburnt magnesite | 86.0 |
| slag wool | 2.0 |
| paper | 2.5 |
| boric acid | 3.5 |
| starch | 4.0 |
| urea-formaldehyde resin | 2.0 |

The density of the slab was 1.3 g/cm$^3$ and it had a transverse strength of 20 kg/cm$^2$. The slab performed well when used as part of the inner lining of a tundish used in the continuous casting of steel and the slab had particularly good erosion resistance.

In the above Examples, the transverse strengths were measured using slab samples 23 cm long, 5 cm wide and 3 cm thick (the thickness of the slabs as made). The instrument used had a first support, from one side of which projects a pair of parallel knife edges spaced 18 cm apart, from apex to apex, and a second support, facing and parallel to the first support and having a single knife edge, projecting from the side of the second support facing the first support and parallel to and centrally positioned in relation to the other knife edges. One of the supports is movable towards the other and the measurement procedure involved putting the sample between the supports, symmetrically in relation to the knife edges, and bringing one support towards the other at a rate of 12 mm/minute until the sample broke. The instrument indicated the stress, in terms of force per unit area, required to cause the slab to break and the result was expressed in kg/cm$^2$ to give the transverse strengths.

We claim:

1. A preformed shaped, refractory, heat-insulating metallurgical vessel liner produced by forming an aqueous slurry of a dry mixture comprising, by weight:
   A. 1 to 4 percent of urea-formaldehyde resin,
   B. 1 to 6 percent of starch as binder,
   C. 0.5 to 5 percent of water-soluble borate compound, and
   D. 75-95 percent of a particulate refractory material, dewatering the slurry in a permeable mold and heating to dry the shaped mixture and harden the binder.

2. The liner according to claim 1 in which the borate compound is an alkali metal borate or boric acid.

3. The liner according to claim 1 which contains fibrous matter.

4. The liner according to claim 3 in which organic fibres are present in a proportion of 0.3 to 3% by weight.

5. The liner according to claim 3 in which the refractory fibres are present in a proportion of 1 to 10% by weight.

6. The liner according to claim 1 in the shape of a sleeve or slab.

* * * * *